Oct. 8, 1940.   F. E. GOEHRING, SR   2,217,475
ATTACHMENT FOR EYEGLASSES
Filed Sept. 25, 1939
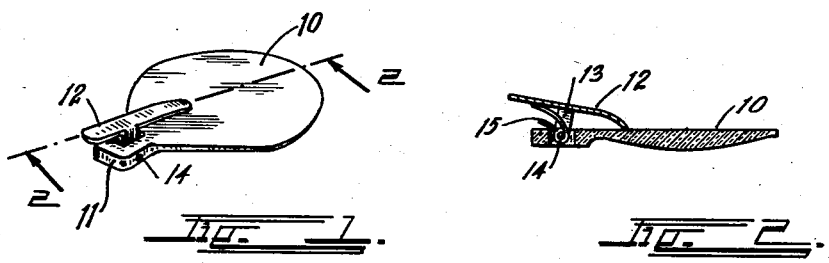
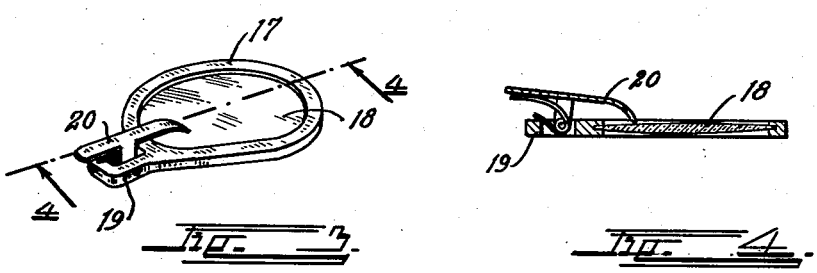
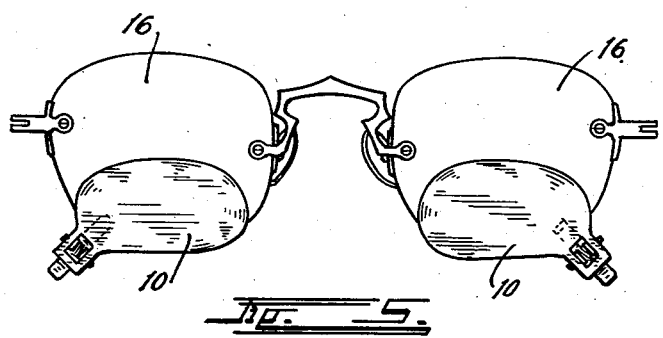
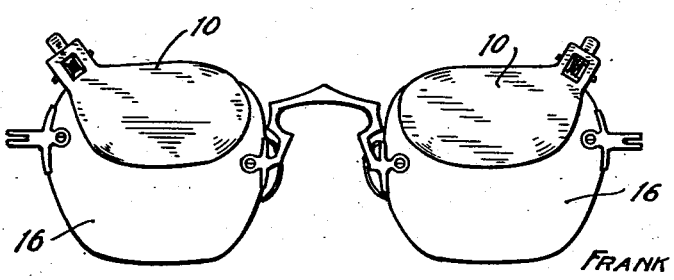
INVENTOR
FRANK E. GOEHRING, SR.
BY
ATTORNEY Patented Oct. 8, 1940

2,217,475

UNITED STATES PATENT OFFICE 2,217,475

ATTACHMENT FOR EYEGLASSES

Frank E. Goehring, Sr., Denver, Colo.

Application September 25, 1939, Serial No. 296,433

3 Claims. (Cl. 88—41)

This invention relates to an auxiliary lens for spectacles and has for its principal object the provision of a light weight auxiliary lens which can be quickly, easily and securely placed upon the spectacle lenses at any desired position thereon to suit the convenience and requirements of the user.

The invention is more particularly designed for converting the ordinary distance spectacle lens into a near vision lens when the eyes are to be used for reading or other close work. It is, of course, not limited to this particular use however, since the auxiliary lens may carry a distance glass which can be placed over the upper or other portion of a reading type lens to allow the user to clearly discern distant objects.

Another object of the invention is to provide a lens of this type which will be of non-breakable, one-piece construction and which will not require drilling for the attachment of mountings.

Other advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and through the description.

In the drawing:

Fig. 1 is a perspective view of the simplest form of the invention.

Fig. 2 is a sectional view, taken on the line 2—2, Fig. 1.

Fig. 3 is a perspective view of a rim type form of the invention.

Fig. 4 is a section therethrough, taken on the line 4—4, Fig. 3.

Fig. 5 illustrates the invention in use as a reading glass on the lower portion of a pair of spectacle lenses.

Fig. 6 illustrates the auxiliary lenses positioned on the upper portions of the spectacle lenses.

The lenses of this invention are preferably formed of a transparent plastic, such as "Lucite." The lenses of a typical spectacle are illustrated at 16.

In the form of Fig. 1, a pad of Lucite or similar transparent, non-breakable material is ground to any desired surface contour to form a refracting auxiliary lens 10 with an integral projecting ear 11. A clamping clip 12, provided with hinge tabs 13, is hinged within an opening in the ear 11 upon a suitable hinge pin 14. A coil spring 15 constantly urges the inner extremity of the clip toward the lens 10.

In use, the auxiliary lenses are slipped over either the rear or forward faces of the spectacle lenses 16, with the clamping clips 12 engaging the opposite faces thereof so that the auxiliary lenses 10 lie flat against the faces of the spectacle lenses 16. They can be placed over the lower portions of the spectacle lenses, as shown in Fig. 5, or they can be inverted and alternated and placed over the upper portions thereof, as shown in Fig. 6.

It is desired to call attention to the fact that the auxiliary lens 10 and the ear 11 for the clamping clip 12 are all formed from a single unitary piece of non-breakable plastic. The ear serves as a finger hold to prevent soiling of the lenses.

The form of Figs. 3 and 4 is similar to the previously described form except for the fact that the plastic forms only a lens rim 17 for supporting any desired type of lens 18. A clamping bracket ear 19 is formed integrally with the rim 17 and carries a clamping clip 20 similar to the first form. The uses for the second form correspond, of course, to those of the first form.

It is desired to call attention to the specific shape of the auxiliary lenses. Their contour conforms to the general outline of the spectacle lenses when in place, either at the top or bottom thereof, so as to create a neat and attractive appearance at all times.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. An auxiliary lens for spectacles comprising: a pad of transparent plastic, ground to a desired lens refraction; an ear portion projecting from said pad and formed integrally therewith; a clamping clip extending over said pad; tabs projecting from said clamping clip into an opening in said ear portion; a pin passing through said ear portion, hingedly mounting said tabs therein; and a spring constantly urging the lens extremity of said clamping clip toward said lens portion.

2. An auxiliary lens for attachment to a spectacle lens comprising: a unitary pad of transparent material; a lens portion formed on said pad of less area than the spectacle lens; an ear formed integrally with said lens portion and projecting outwardly therefrom, said ear having an open center portion; a hinge pin extending across said open center; and a spring actuated clamping clip hinged on said pin for clamping said auxiliary lens to the spectacle lens.

3. An auxiliary lens for attachment to a spectacle lens comprising: a unitary pad of transparent material; a lens portion formed on said pad of less area than the spectacle lens; an ear formed integrally with said lens portion and projecting outwardly therefrom, said ear having an open center portion; a hinge pin extending across said open center; a clamping clip; projecting hinge tabs on said clip extending into the open center portion and hingedly engaging said pin, said clip extending inwardly toward said lens portion to clamp the latter against the spectacle lens; and a spring urging said clip toward said lens portion.

FRANK E. GOEHRING, Sr.